No. 717,821. PATENTED JAN. 6, 1903.
W. A. DAGGETT.
TROLLEY FOR ELECTRIC CARS.
APPLICATION FILED APR. 22, 1902.
NO MODEL.

Witnesses
Louis D. Heinrichs
L. H. Morrison

Inventor
William A. Daggett
By his Attorney
W. Preston Williamson

UNITED STATES PATENT OFFICE.

WILLIAM A. DAGGETT, OF VINELAND, NEW JERSEY.

TROLLEY FOR ELECTRIC CARS.

SPECIFICATION forming part of Letters Patent No. 717,821, dated January 6, 1903.

Application filed April 22, 1902. Serial No. 104,155. (No model.)

*To all whom it may concern:*

Be it known that I, WILLIAM A. DAGGETT, a citizen of the United States, residing at Vineland, county of Cumberland, and State of New Jersey, have invented a certain new and useful Improvement in Trolleys for Electric Cars, of which the following is a specification.

My invention relates to a new and useful improvement in trolleys for electric cars, and has for its object to provide a trolley which will have a yielding connection independent of the trolley-pole connection with the car, thereby doing away with the usual pounding or jumping, and thus preventing the trolley from being disconnected with the wire.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1:
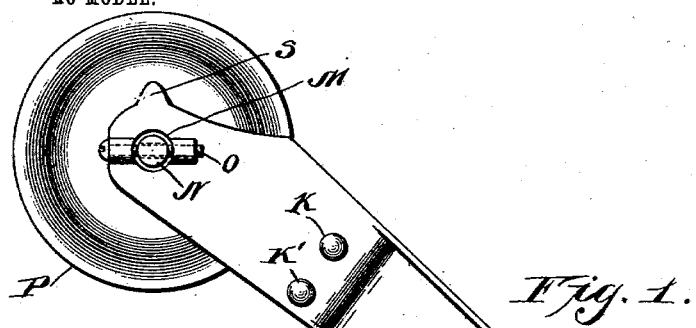
Figure 2:
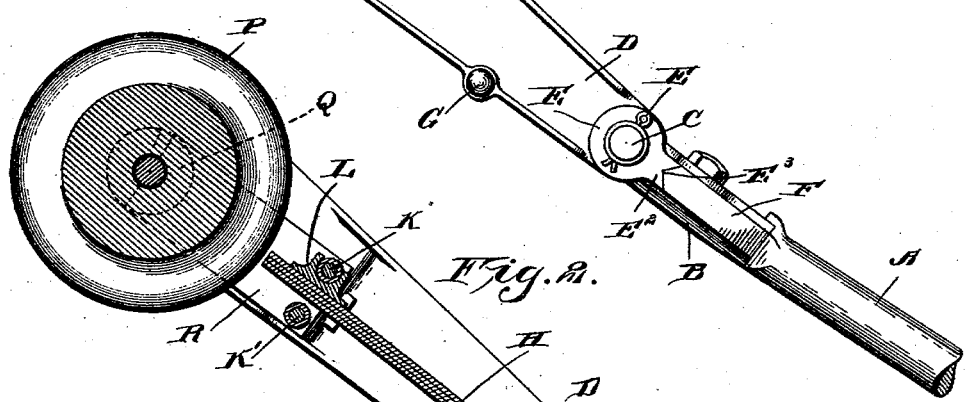
Figure 4:
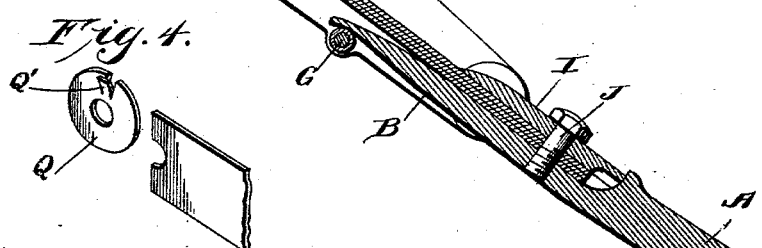
Figure 3:
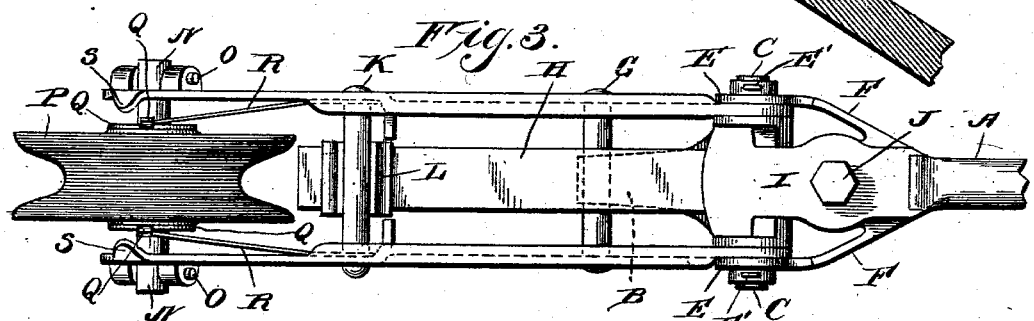

Figure 1 is a side elevation of the trolley-fork; Fig. 2, a longitudinal section of the same; Fig. 3, a plan view of the trolley-fork; Fig. 4, a detail perspective view of one of the washers and the end of one of the contact-springs.

This invention is intended as an improvement over patent issued to me September 18, 1900, for trolleys, No. 658,243, and the particular improvements over this patent consist mainly in allowing the trolley-wheel a certain amount of rocking movement within its bearings and in providing washers upon each side of the trolley-wheel, which will remain stationary in contact with the contact-springs, thus doing away with the friction upon the springs themselves, and further improvements in the details of construction, but not in any way altering the principle, only making a more practical device.

In the drawings, A represents a shank to which is adapted to be secured the trolley-pole, and formed with this shank and extending upward from the same is an arm B, and extending outward from each side of this arm are studs C, which pass through the lower end of the two prongs D, forming the trolley-fork. Upon the outside of the prongs washers E surround the stud C, and these washers are secured in place in any suitable manner, here shown as between the cotter-pins E'. These washers E are formed with an extension $E^2$, extending toward the trolley-pole, and the ends of these extensions are cut out in V shape, as represented at $E^3$.

F represents projections formed with and extending outward from the sides of the arm B, and the ends of these projections are formed with a double bevel to fit into the V-shaped notch $E^3$ of the washer E. These projections F merge into the arm B where it merges into the shank A, and the purpose of these arms is for keeping the washer E from turning and also for preventing the wire from coming in contact with any abrupt shoulder or projection of the trolley-fork when trying to place the trolley upon the wire.

G is a bolt passing through both prongs of the fork, and around this bolt in between the prongs is a sleeve which holds the two prongs of the fork at equal distances apart, while the bolt or rivet G secures them tightly together. Upon this bolt or rivet G rests the forward end of the arm B.

H is a flat spring, preferably made of a number of leaves, and the lower end of this spring is clamped to the arm B by means of a plate I, placed over the spring, so as to confine the spring between this plate and the arm B, and then a bolt J is passed through the plate and spring and threaded in the arm B. The arm B is curved upon the upper face to allow the spring to bend around it when the trolley-wheel is depressed.

K and K' are two bolts or rivets passing through the fork from one prong to the other, so as to bind the prongs or side plates G together, and between these prongs or side plates are interposed sleeves around the bolts or rivets to keep the side plates separated the required distance. The upper end of the spring H passes between these rivets K and K', and between the spring and the bolt or rivet K is interposed a shoe L, which is flat upon the under side, against which the spring comes in contact, and the upper side of the shoe is channeled so as to fit around the sleeve which surrounds the bolt or rivet K. This shoe is not secured to the spring in any manner and is held in place simply by the tension of the spring pressing upward, and this upward tendency of the spring also holds the fork, which is pivoted upon the stud C, in the proper normal position. The bolt or rivet G, abutting against the under side of the arm B, limits the upward movement of the fork.

In the extreme upper end of each of the side plates D of the fork are formed holes M, and through these holes pass the spindle N from one side plate or prong to the other. This spindle N is somewhat smaller in diameter than the hole M, and passing through each end of the spindle are pins O, which pins pass through the spindle on a horizontal line and are passed through a lug upon one side of the opening M, then through an opening formed in the spindle, and then threaded into a lug upon the opposite side of the opening M. The opening through the spindle through which the pin O extends is somewhat larger in diameter than the pin. Thus a slight amount of rocking movement is allowed the spindle in a horizontal line. The trolley-wheel P is mounted upon the spindle N in between the prongs or side plates D of the fork, and thus the trolley-wheel will be able to rock or tilt slightly in a horizontal line to accommodate itself to curves or irregularities in the trolley-wire. The trolley-wheel P is mounted loosely upon the spindle N and may be slid along the spindle from side to side between the side plates or prongs D. This sliding motion also allows the wheel P to accommodate itself to the curves and irregularities of the wire. Surrounding the spindle N upon each side of the hub of the wheel P are washers Q, preferably made of copper.

R represents flat thin springs or brushes, one upon each side of the trolley-wheel and one secured to each of the side plates or prongs D by being confined at the lower end between the sleeves which surround the rivets or bolts K and K' and the side plates D. The upper or free ends of the springs bear against the washers Q upon each side of the trolley-wheel, and in this manner a good electric contact is formed between the trolley-wheel and the trolley-fork, and the springs also serve the purpose of keeping the trolley-wheel normally centered between the prongs or side plates D.

For the purpose of preventing the washers Q from turning with the wheel, and thus causing wear upon the ends of the springs R, a portion of each washer is punched outward, as indicated at Q', and this punched-out portion abuts against the end of the spring R, and thus keeps said washer from turning with the wheel. Upon the upper end of each of the prongs or side plates D are formed ears S, which are bent inward at an incline, and these ears are for the purpose of preventing the wire from entering between the side plates and the trolley-wheel when trying to place the trolley-wheel upon the wire.

In operation when the trolley is in action and is forced downward relative to the pole the spring H will be bent over the arm B, and then if from any cause the pole is bent downward the spring H will straighten and throw the trolley-fork upward relative to the pole and in this way tend to keep the trolley upon the wire, thus avoiding any shock, as is the case when the trolley leaves the wire and suddenly moves again in engagement therewith, occasioning what is generally called "trolley-pounding."

Of course I do not wish to be limited to the exact construction here shown, as slight modifications could be made without departing from the spirit of my invention.

Having thus fully described my invention, what I claim as new and useful is—

1. In a trolley, a fork comprising side plates or prongs, the upper end of said prongs being provided with openings, a spindle extending across the fork and protruding through said openings, said spindle being less in diameter than the openings, pins passing through the ends of the spindle horizontally, a trolley mounted to rotate upon the spindle between the side plates, a spring-yielding connection between the frame and the trolley-pole, and contact-brushes bearing against each side of the trolley and secured to each of the side plates, substantially as specified.

2. In a trolley, a trolley-fork consisting of two side plates, a spring-yielding connection between the fork and the trolley-pole, the upper end of each of said side plates being provided with openings, a spindle passing through said openings and across the fork, said openings being considerably greater in diameter than the spindle, lugs formed upon the outside of the side plates upon each side of the openings, pins passing through the lugs and also through openings provided through the ends of the spindle upon a horizontal line, the openings through the spindle being considerably greater in diameter than the pins, a trolley loosely journaled upon the spindle between the side plates, washers surrounding the spindle upon each side of the trolley, contact springs or brushes each secured at its lower end to one of the side plates, the upper free end of each spring pressing against one washer upon one side of the trolley, and means for holding the washer stationary while the trolley is revolving, as and for the purpose specified.

3. In combination with a device of the character described, a trolley-fork, a trolley mounted to revolve between the prongs of said fork, a washer arranged upon each side of the trolley, lugs protruding outward from each washer, contact springs or brushes arranged upon each side of the trolley and bearing against the washers, the lugs adapted to come in contact with the ends of the springs and hold said washer stationary while the trolley is revolving, substantially as specified.

4. In a trolley, a shank adapted to be secured to the trolley-pole, a curved arm extending upward from the shank, side plates forming the trolley-fork pivoted on each side to said arm, a trolley mounted between the upper end of said side plates, a spring secured at its lower end to the upper face of the curved arm, a plate arranged above the spring, between which plate and arm the spring is adapted to be clamped, a bolt passing through the plate and the spring and threaded into the arm, a cross bolt or rivet extending between the side plates near the upper end of the same, a shoe interposed between the upper end of the spring and said cross bolt or rivet so that the spring will tend to force the trolley-fork upward, a cross bolt or rivet abutting against the under side of the curved arm for the purpose of limiting the upward movement of the trolley-fork, as and for the purpose specified.

In testimony whereof I have hereunto affixed my signature in the presence of two subscribing witnesses.

WILLIAM A. DAGGETT.

Witnesses:
   DEAN MACGEORGE,
   HENRY S. ALVORD.